United States Patent
Xie et al.

(10) Patent No.: US 8,812,941 B2
(45) Date of Patent: Aug. 19, 2014

(54) VITERBI DEVICE AND METHOD USING A POSTERIORI INFORMATION

(75) Inventors: Jin Xie, Longmont, CO (US); Mats Oberg, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 71 days.

(21) Appl. No.: 13/536,041

(22) Filed: Jun. 28, 2012

(65) Prior Publication Data

US 2013/0022156 A1    Jan. 24, 2013

Related U.S. Application Data

(60) Provisional application No. 61/509,976, filed on Jul. 20, 2011.

(51) Int. Cl.
*H03M 13/03*    (2006.01)
(52) U.S. Cl.
USPC ............................. 714/795; 714/782; 714/786
(58) Field of Classification Search
USPC .......... 714/795, 796, 782, 792, 786; 375/265, 375/341
See application file for complete search history.

(56) References Cited

U.S. PATENT DOCUMENTS

| | | | |
|---|---|---|---|
| 5,321,725 A * | 6/1994 | Paik et al. ...................... | 375/265 |
| 5,862,156 A | 1/1999 | Huszar et al. | |
| 5,973,628 A * | 10/1999 | McDonnell et al. ............ | 341/67 |
| 6,161,209 A * | 12/2000 | Moher .......................... | 714/780 |
| 6,172,626 B1 * | 1/2001 | McDonnell et al. ............ | 341/67 |
| 6,201,839 B1 | 3/2001 | Kavcic et al. | |
| 6,477,208 B1 * | 11/2002 | Huff .............................. | 375/265 |
| 6,570,910 B1 | 5/2003 | Bottomley et al. | |
| 7,088,793 B1 * | 8/2006 | Mickelson et al. ........... | 375/341 |
| 7,376,249 B2 * | 5/2008 | Beun ............................. | 382/107 |
| 2009/0041166 A1 * | 2/2009 | Patel et al. .................... | 375/341 |

OTHER PUBLICATIONS

International Search Report issued in International Application No. PCT/US2012/044518 dated Aug. 29, 2012.
Written Opinion issued in International Application No. PCT/US2012/044518 dated Aug. 29, 2012.

* cited by examiner

*Primary Examiner* — Fritz Alphonse

(57) ABSTRACT

New and useful methods and systems for providing improved performance of a Viterbi device are disclosed. For example, in an embodiment a Viterbi device includes metric circuitry configured to determine branch metrics using at least one of a variance signal based on both received data and detected data of the Viterbi device and a priori probabilities of available state transitions within a trellis of the Viterbi device.

20 Claims, 4 Drawing Sheets

VITERBI DEVICE AND METHOD USING A POSTERIORI INFORMATION

INCORPORATION BY REFERENCE

This application claims the benefit of U.S. Provisional Application No. 61/509,976 entitled "Revise Viterbi branch metric to reflect prior information with d constraint" filed on Jul. 20, 2011, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The Viterbi algorithm is used in a large variety of signal processing circuits, such as communication circuitry where convolutional encoding is used, or where inter-symbol interference can be found. Traditional Viterbi detectors work to minimize the Euclidean distance between a received/sampled sequence of data and a predicted sequence (the sequence determined by a Viterbi detector/estimator) of data, thereby minimizing the probability of an incorrect sequence being predicted. However, traditional Viterbi devices may fail to take into account all possible information that may be used to improve performance.

SUMMARY

Various aspects and embodiments of the invention are described in further detail below.

In an embodiment, a Viterbi device includes metric circuitry configured to determine branch metrics using at least one of a variance signal based on both received data and estimated/detected data of the Viterbi device and a priori probabilities of available state transitions within a trellis of the Viterbi device.

In another embodiment, a method for performing a modified Viterbi algorithm is disclosed. The method includes, using metric circuitry, determining branch metrics using at least one of a variance signal based on both received data and estimated/detected data produced by the Viterbi algorithm and a priori probabilities of available state transitions within a trellis operated by the Viterbi algorithm.

In yet another embodiment, an apparatus includes a data source configured to produce a stream of received data, a Viterbi device configured to produce a stream of estimated data to a data sink, the Viterbi device including metric circuitry configured to determine branch metrics using at least one of a variance signal based on both received data and detected data of the Viterbi device and a priori probabilities of available state transitions within a trellis; and variance determination circuitry configured to dynamically update the variance signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Figure 1:
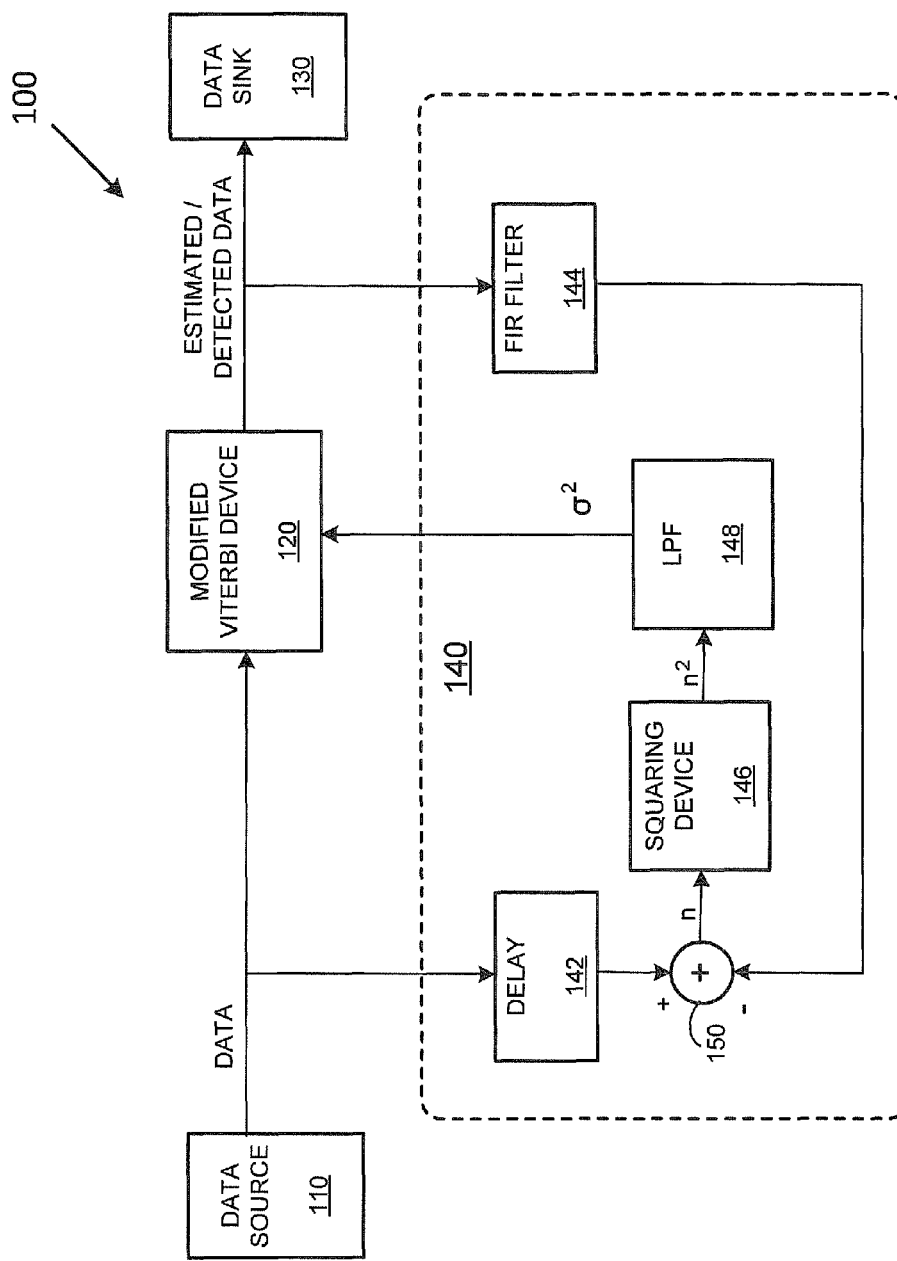
FIG. 1 is an example of a modified Viterbi-based detector/estimator.

FIG. 1 is an example of a modified Viterbi-based detection/estimation apparatus 100. The apparatus 100 includes a data source 110, a modified Viterbi device 120, a data sink 130 and variance determination circuitry 140. The variance determination circuitry 140 includes a delay 142, a Finite Impulse Response (FIR) filter 144, a squaring device, a low-pass filter (LPF) 148, and a subtracting device 150.

The example apparatus 100 is an optical drive/storage system with the source 110 being an optical reader coupled to an optical medium, such as a Digital Video Disc (DVD) or Compact Disc (CD), and the data sink 130 being any number of electronic storage systems and/or electronic conversion systems (e.g., a digital to analog/audio converter). However, in different embodiments the apparatus 100 can be any number of different devices that might employ convolutional decoding, such as a wireless communication system, a magnetic-based storage system, and so on.

While the modified Viterbi device 120 and the variance determination circuitry 140 of the present example are embodied in an array of dedicated electronic circuitry, it is to be appreciated in light of this disclosure that any component/device described in this disclosure may take a variety of other forms, such as optical processing circuitry, quantum processing circuitry, software/firmware operating on a digital signal processor (or other computing device), or any possible combination thereof.

In operation, the data source 110 provides a stream of input/received data to the modified Viterbi device 120 and to the delay 142.

The modified Viterbi device 120 receives the stream of input data, then performs a modified Viterbi algorithm that incorporates a technique to determine branch metrics between states of an internal trellis that is further described below. Using the input data and the modified Viterbi algorithm, the modified Viterbi device 120 produces a stream of estimated data that is fed to both the data sink 130 and to the FIR filter 144.

The FIR filter 144 receives the stream of estimated data and convolves the stream of estimated data with a filter mimicking the channel response to produce an estimate of the ideal Viterbi input.

As with the modified Viterbi device 120, the delay 142 receives the stream of input data, but unlike the modified Viterbi device 120, the delay 142 performs no processing on the input data other than delaying each sample by M sample periods (which should be the same delay caused by the modified Viterbi device 120) to produce a stream of delayed input data.

The subtracting device 150 receives the stream of delayed input data, and subtracts from it the stream of reproduced data from FIR filter 144, to produce a stream of difference data n. The difference data is then squared by the squaring device 146 to produce a stream of squared difference data $n^2$.

The stream of squared difference data $n^2$ is then provided to the LPF 148, which uses the squared difference data $n^2$ to produce a variance signal $\sigma^2$. It is to be appreciated that the terms "low pass filter" and/or "LPF" are to be construed broadly to encompass any number of low-pass filters or averaging devices. For example, it is possible that the LPF 148 can take a running average of the last P samples to determine the variance signal $\sigma^2$. The variance signal $\sigma^2$ is then fed to the modified Viterbi device 120 thus allowing the modified Viterbi device 120 to perform improved detection/estimation as will be further explained below.

Figure 2:
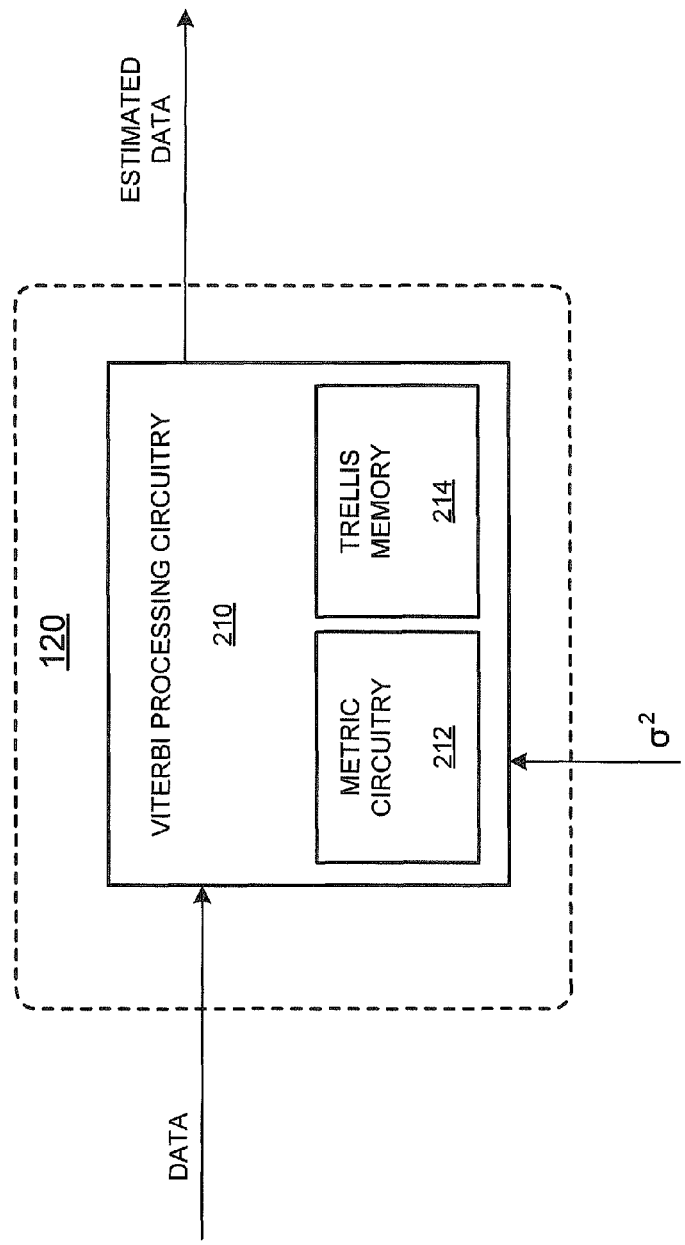
FIG. 2 shows details the modified Viterbi device of FIG. 1.

FIG. 2 shows details the modified Viterbi device 120 of FIG. 1. The modified Viterbi device 120 includes Viterbi processing circuitry 210 having metric circuitry 212 and trellis memory 214. While the example modified Viterbi device 120 also contains other components, such as some form of path metric device or a trace-back device, such devices are not discussed in this disclosure for simplicity of explanation.

Also, while the exemplary modified Viterbi device 120 is discussed as conforming to a d-metric (minimum distance metric), which is an approach to encoding, it is to be appreciated that the methods and systems disclosed herein are not necessarily limited to d-metric based systems.

In operation, both a stream of input/received data and a variance signal $\sigma^2$ are received by the Viterbi processing circuitry 210. The input data is stored in the trellis memory 214, and the metric circuitry 212 then assigns metric weights according to various known and novel criteria. In the present embodiment, the metric circuitry 212 assigns weights according to Equation (1) below:

$$\min_{b_0 \ldots b_k} \sum_{i=0}^{k} \{(r_i - y_i)^2 - 2\sigma^2 \ln[p(b_i | b_{i-1}, b_{i-2}, \ldots, b_0)]\} \quad (1)$$

where $(r_i - y_i)^2$ is the branch metric term for the Viterbi algorithm, $2\sigma^2$ represents the contribution of variance (an a priori contribution), and $\ln\lfloor p(b_i | b_{i-1}, b_{i-2}, \ldots, b_0)\rfloor$ represents the a priori probability for a particular branch.

To process the d-metric portion, the probability of a path $p(b_1 | b_{i-1}, b_{i-2}, \ldots, b_0)$ is determined by the metric circuitry 212.

Figure 3:
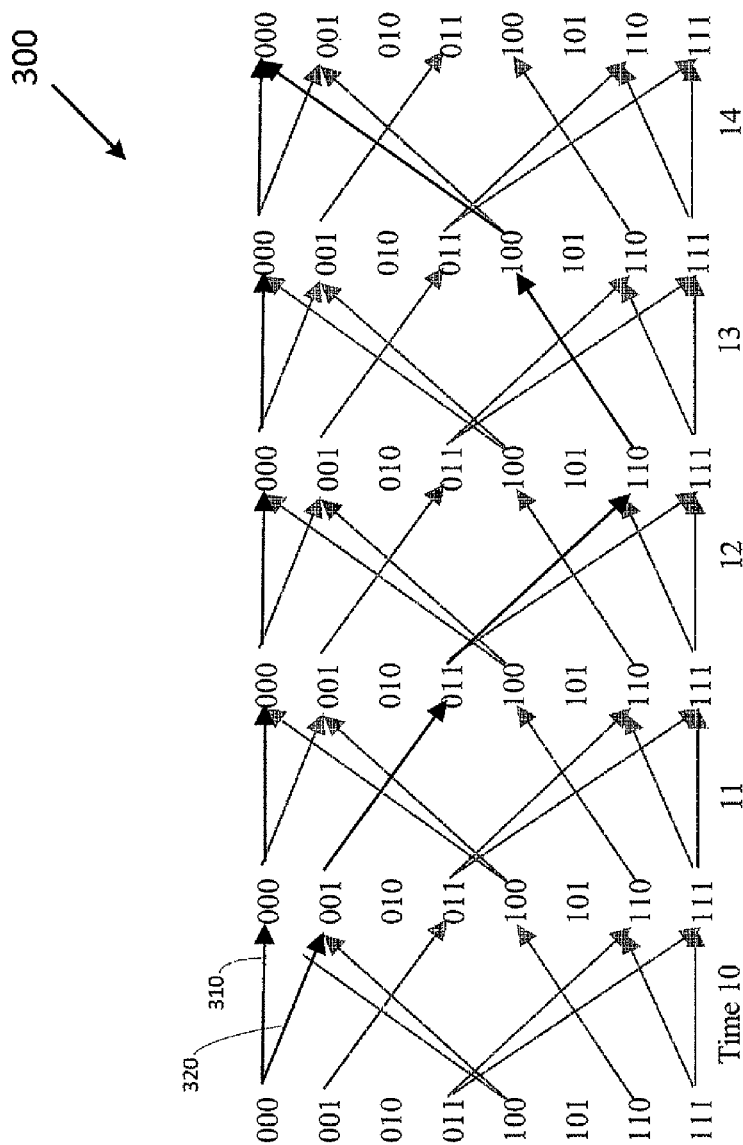
FIG. 3 depicts an example of the trellis of the Viterbi device of FIG. 2.

For the example Viterbi trellis, which is depicted in FIG. 3, there are at most two branches going from each state, and at most two branches going to each state. Assuming that a d-constraint is operative and d=1, some branches can be removed from consideration. For instance, for state {000}, the only possible transition states are {000} and {001}; and for state {001}, the only possible transition state is {011}. The probability p of all other transitions for states {000} and {001}=0. As the natural logarithm of zero is infinity, then $\ln[0]=\infty$ represents branches that will never occur. In differing embodiments there can be Viterbi detectors and Viterbi-like detectors that can have more than two incoming and outgoing branches from states.

For branches that are possible, probability p can be set to a constant. For example, if only two branches are available, then for each possible branch probability p can be set to 0.5. Similarly, if one branch is available for a particular transition, then probability p can be set to 1 for this branch, and so on.

However, in other embodiments it is possible to set probabilities based on actual data. For example, during data sample and capture, one can count how many times a first pattern {0110} occurs, and count how many times a second pattern {0111} occurs. The first pattern {0110} represents state(011)→state(110) transition, and the second pattern {0111} represents state(011)→state(111) transition. Assuming that during data capture it is observed that the first pattern occurs N times and the second pattern occurs M times, then one can estimate p(0|011)=N/(N+M), and p(1|011)=M/(N+M).

By factoring in the probability p and variance contribution according to Equation (1) above, then the performance of a Viterbi decoder/estimator can be substantially improved, with simulations showing a performance increase of as much as 10% under some conditions. This performance contribution is the effect of applying a complete maximum a posteriori (MAP) theory to Viterbi devices.

FIG. 3 depicts an example of the trellis 300 of the Viterbi device of FIG. 2. The probabilities for each transition (having length 4 target and d=1) were taken from a simulated data capture and are as follows:

p(0|000)=0.551913, p(1|000)=0.448087
p(0|001)=0.000000, p(1|001)=1.000000
p(0|011)=0.376190, p(1|011)=0.623810
p(0|100)=0.622894, p(1|100)=0.377106
p(0|110)=1.000000, p(1|110)=0.000000
p(0|111)=0.448747, p(1|111)=0.551253

While the probabilities above were sampled from statistical data taken ahead of time and are static, it is to be appreciated that such probabilities may be dynamically updated from time to time during the operation of the modified Viterbi device 120.

Reviewing FIG. 3, compare the probabilities of (upper) path 310 versus (lower) path 320.

For path 310, the a priori probability=p(000)*p(0|000)*p(0|000)*p(0|000)*p(0|000)*p(0|000)=p(000)*$0.551913^5$=p(000)*0.0512.

In contrast, the a priori probability for path 320=p(000)*p(1|000)*p(1|001)*p(0|011)*p(0|110)*p(0|100)=
p(000)*0.448087*1*0.376190*1*0.622894=
p(000)*0.1050.

Thus, from an a priori standpoint path 320 is the more likely path.

For a conventional Viterbi algorithm, the path metric difference at time 14 is:

$$\sum_{i=10}^{14} \{(r_i - y_{PATH310i})^2\} - \sum_{i=10}^{14} \{(r_i - y_{PATH320i})^2\} \quad (2)$$

For the modified Viterbi algorithm, however, each branch metric of path 310 is altered by adding a positive value $-2\sigma^2 \ln(0.551913)$. Accordingly, the branch metric for path 310 at time 14 is:

$$\sum_{i=10}^{14} \{(r_i - y_{PATH310i})^2\} - 5*2\sigma^2 \ln(0.551913) = \quad (3)$$

$$\sum_{i=10}^{14} \{(r_i - y_{PATH310i})^2\} - 2\sigma^2 \ln(0.0512) =$$

-continued $$\sum_{i=10}^{14} \{(r_i - y_{PATH310i})^2\} + 5.9440\sigma^2$$

In contrast, each branch metric of path 320 is altered by adding a positive value $-2\sigma^2\ln(c)$, so at time 14 the metric for path 320 is:

$$\sum_{i=10}^{14} \{(r_i - y_{PATH320i})^2\} - 2\sigma^2\ln(0.448087) - 2\sigma^2\ln(1) - \quad (4)$$

$$2\sigma^2\ln(0.376190) - 2\sigma^2\ln(1) - 2\sigma^2\ln(0.622894) =$$

$$\sum_{i=10}^{14} \{(r_i - y_{PATH320i})^2\} - 2\sigma^2\ln(0.1050) =$$

$$\sum_{i=10}^{14} \{(r_i - y_{PATH320i})^2\} + 4.5076\sigma^2$$

where $\sigma^2$ is the variance and c is a probability for a particular transition determined by a priori sampling.

Therefore the path metric difference (Path 310-Path 320) at time 14 is:

$$\sum_{i=10}^{14} \{(r_i - y_{PATH310i})^2\} - \sum_{i=10}^{14} \{(r_i - y_{PATH320i})^2\} + 1.4364\sigma^2 \quad (5)$$

which favors path 320 as being the more likely correct path as the added amount ($5.9440\sigma^2$) for path 310 is greater than the added amount ($4.5076\sigma^2$) for path 310.

Figure 4:
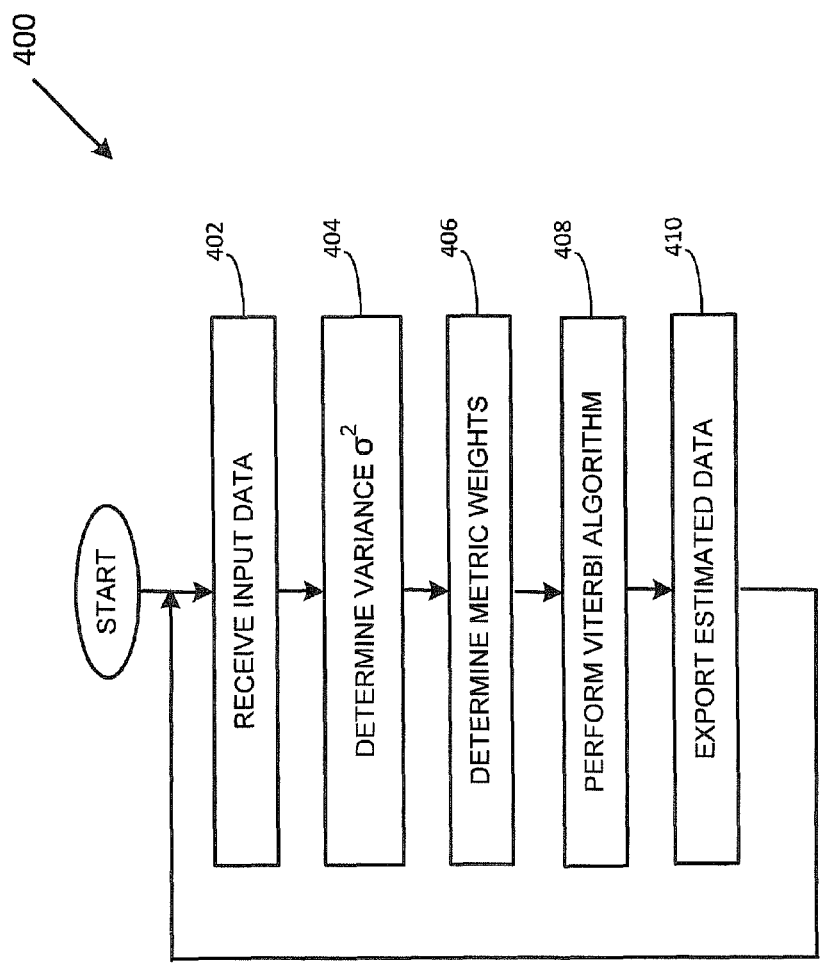
FIG. 4 is a flowchart outlining an example approach for performing an improved Viterbi detection/estimation technique.

FIG. 4 is a flowchart outlining an example approach for performing an improved Viterbi detection/estimation technique. At 402 a sample for a stream of input data is received by a device employing the modified Viterbi algorithm discussed above. Next, at 404, the variance $\sigma^2$ of system performance can be determined by, e.g., using the system approach discussed above with respect to FIG. 1. Then, at 406, metric weights can be assigned using Equation (1) above taking into account any relevant d-constraint, the variance $\sigma^2$ of 404 and a set of state transition probabilities p that can be predetermined from statistical data.

At 408, a Viterbi algorithm can be performed using the metric weights of 406, and at 410 estimated/detected data can be exported to an external device. Control then jumps back to 402 where the process repeats for the next sample in the stream of data.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A Viterbi device, comprising:
    metric circuitry configured to determine branch metrics for branches of a state having at least two branches using at least one of a variance signal based on both received data and detected data of the Viterbi device and a priori probabilities of available state transitions within a trellis.

2. The device of claim 1, wherein the metric circuitry is configured to determine branch metrics using only the variance signal.

3. The device of claim 1, wherein the metric circuitry is configured to determine branch metrics using both the variance signal and the a priori probabilities.

4. The device of claim 3, wherein the metric circuitry is further configured to determine branch metrics using a priori probabilities derived from ad-constraint of the received data.

5. The device of claim 2, wherein the metric circuitry is configured to determine branch metrics using the a priori probabilities.

6. The device of claim 1, further comprising variance determination circuitry configured to dynamically update the variance signal.

7. The device of claim 6, wherein the variance determination circuitry includes:
    a delay configured to delay the received data to produce a delayed input signal;
    a Finite Impulse Response (FIR) filter configured to convolve detected data with target data to produce convolved data;
    a subtracting device configured to subtract the convolved data from the delayed input signal to produce a difference signal; and
    a squaring device and a low-pass filter (LPF) configured to produce the variance signal using the difference signal.

8. The device of claim 1, wherein the metric circuitry is configured to determine branch metrics according to:

$$\min_{b_0 \ldots b_k} \sum_{i=0}^{k} \{(r_i - y_i)^2 - 2\sigma^2\ln[p(b_i | b_{i-1}, b_{i-2}, \ldots, b_0)]\}$$

where $(r_i-y_i)^2$ is a conventional branch metric term for the Viterbi algorithm, $\sigma^2$ represents the variance of the variance signal, and $\ln[p(b_i|b_{i-1}, b_{i-2}, \ldots, b_0)]$ represents the probability for a particular branch.

9. A method for performing a modified Viterbi algorithm, comprising:
    using metric circuitry, determining branch metrics for branches of a state having at least two branches using at least one of a variance signal based on both received data and detected data produced by the Viterbi algorithm and a priori probabilities of available state transitions within a trellis operated by the Viterbi algorithm.

10. The method of claim 9, wherein determining branch metrics includes determining branch metrics using only the variance signal.

11. The method of claim 9, wherein determining branch metrics includes determining branch metrics using both the variance signal and the a priori probabilities.

12. The method of claim 11, wherein determining branch metrics further includes determining branch metrics using a priori probabilities derived from ad-constraint of the received data.

13. The method of claim 9, wherein determining branch metrics includes determining branch metrics using the a priori probabilities.

14. The method of claim 9, further comprising dynamically updating the variance signal.

15. The method of claim 14, wherein dynamically updating the variance signal includes:
    delaying the received data to produce a delayed input signal;

convolving detected data with target data to produce convolved data;
subtracting the convolved data from the delayed input signal to produce a difference signal; and
producing the variance signal using the difference signal.

16. The method of claim 9, wherein determining branch metrics is performed according to:

$$\min_{b_0 \ldots b_k} \sum_{i=0}^{k} \{(r_i - y_i)^2 - 2\sigma^2 \ln[p(b_i | b_{i-1}, b_{i-2}, \ldots, b_0)]\}$$

where $(r_i-y_i)^2$ is a conventional branch metric term for the Viterbi algorithm, $\sigma^2$ represents the variance of the variance signal, and $\ln[p(b_i|b_{i-1}, b_{i-2}, \ldots, b_0)]$ represents the probability for a particular branch.

17. An apparatus, comprising:
a data source configured to produce a stream of data;
a Viterbi device configured to produce a stream of detected data to a data sink, the Viterbi device including metric circuitry configured to determine branch metrics for branches of a state having at least two branches using at least one of a variance signal based on both received data and detected data of the Viterbi device and a priori probabilities of available state transitions within a trellis; and
variance determination circuitry configured to dynamically update the variance signal.

18. The apparatus of claim 17, wherein the metric circuitry is configured to determine branch metrics using only the variance signal.

19. The apparatus of claim 18, wherein the metric circuitry is configured to determine branch metrics using both the variance signal and the a priori probabilities.

20. The apparatus of claim 19, wherein the metric circuitry is further configured to determine branch metrics using a priori probabilities derived from ad-constraint of the received data.

* * * * *